United States Patent
Fath et al.

(10) Patent No.: US 9,416,879 B2
(45) Date of Patent: Aug. 16, 2016

(54) ASEPTIC DOUBLE SEAT VALVE

(71) Applicants: Matthias Fath, Abtsgmuend-Pommertsweiler (DE); Heiko Stark, Wallerstein (DE); Frank Neuhauser, Neresheim (DE)

(72) Inventors: Matthias Fath, Abtsgmuend-Pommertsweiler (DE); Heiko Stark, Wallerstein (DE); Frank Neuhauser, Neresheim (DE)

(73) Assignee: Pentair Südmo GmbH, Riesbuerg (DE)

( * ) Notice: Subject to any disclaimer, the term of this patent is extended or adjusted under 35 U.S.C. 154(b) by 51 days.

(21) Appl. No.: 14/333,139

(22) Filed: Jul. 16, 2014

(65) Prior Publication Data

US 2014/0326341 A1 Nov. 6, 2014

Related U.S. Application Data

(63) Continuation of application No. PCT/EP2013/066147, filed on Aug. 1, 2013.

(30) Foreign Application Priority Data

Aug. 29, 2012 (DE) .......................... 10 2012 107 992

(51) Int. Cl.
*F16K 1/44* (2006.01)

(52) U.S. Cl.
CPC .................. *F16K 1/443* (2013.01); *F16K 1/446* (2013.01); *F16K 1/44* (2013.01); *Y10T 137/5762* (2015.04); *Y10T 137/88038* (2015.04); *Y10T 137/88062* (2015.04)

(58) Field of Classification Search
CPC .......... F16K 1/44; F16K 1/443; F16K 1/446; Y10T 137/88038; Y10T 137/5762; Y10T 137/88062
USPC ........................ 137/614.17, 614.18, 312, 240
See application file for complete search history.

(56) References Cited

U.S. PATENT DOCUMENTS

| | | | | |
|---|---|---|---|---|
| 14,312 A | * | 2/1856 | Gold | ..................... F24D 19/081 137/200 |
| 3,621,872 A | * | 11/1971 | Fisher | ..................... F24D 17/10 137/494 |

(Continued)

FOREIGN PATENT DOCUMENTS

| CN | 101655167 A | 2/2010 |
|---|---|---|
| CN | 201680021 U | 12/2010 |

(Continued)

OTHER PUBLICATIONS

NPL #1-English translation of FR 1496822 A as provided by EPO's Espacenet.*
International Preliminary Report on Patentability and Written Opinion Application No. PCT/EP2013/066147 Issue Date: Mar. 3, 2015 pp. 9.
International Search Report Application No. PCT/EP2013/066147 Completed: Oct. 11, 2013; Mailing Date: Oct. 18, 2013 2 pages.

*Primary Examiner* — Craig Schneider
*Assistant Examiner* — Josephine Trinidad-Borges
(74) *Attorney, Agent, or Firm* — ST Onge Steward Johnston and Reens LLC

(57) ABSTRACT

An aseptic double seat valve has a housing, which has connections for two pipe conduits. A first valve seat and a second valve seat are arranged spaced apart from one another in the direction of a longitudinal axis in the housing between the connections for the two pipe conduits. A first closing body interacts in a sealing manner with the first valve seat, and a second closing body interacts in a sealing manner with the second valve seat. A first elongate valve stem, which is of hollow design is connected to the first closing body, and a second elongate valve stem, which extends through the interior of the first valve stem, is connected to the second closing body. A diaphragm, which has a radially inner opening, serves to seal off a gap present between the first valve stem and the second valve stem. An outer rim of the diaphragm is fixed in a sealing manner on the second closing body, and the inner rim of the diaphragm is fixed in a sealing manner on the first valve stem.

12 Claims, 2 Drawing Sheets

(56) References Cited

U.S. PATENT DOCUMENTS

| | | | | |
|---|---|---|---|---|
| 4,360,039 | A | * 11/1982 | Jeppsson | F16K 1/385 137/240 |
| 4,373,545 | A | * 2/1983 | Knappe | F16K 1/446 137/240 |
| 4,460,014 | A | * 7/1984 | Mases | F16K 1/446 137/240 |
| 4,522,223 | A | * 6/1985 | Balsys | F16K 1/446 134/166 C |
| 5,085,241 | A | * 2/1992 | Mieth | F16K 1/446 134/166 C |
| 6,056,003 | A | 5/2000 | Madsen et al. | |
| 6,089,255 | A | 7/2000 | Bonnefous et al. | |
| 2010/0108146 | A1 | * 5/2010 | Ferreira | A61L 2/07 137/1 |

FOREIGN PATENT DOCUMENTS

| | | | | |
|---|---|---|---|---|
| CN | 202152857 U | 2/2012 | | |
| DE | 4243111 A1 | 6/1994 | | |
| DE | 19603070 A1 | 8/1996 | | |
| DE | 20317882 U1 | 2/2004 | | |
| DE | 69921224 T2 | 10/2005 | | |
| DE | 102006025653 A1 | 9/2007 | | |
| FR | 1496822 A | * 10/1967 | | F16K 1/44 |
| WO | 9854493 A1 | 12/1998 | | |

* cited by examiner

ASEPTIC DOUBLE SEAT VALVE

CROSS REFERENCES TO RELATED APPLICATIONS

This application is a continuation of international patent application PCT/EP2013/066147, filed on Aug. 1, 2013 and designating the U.S., which international patent application has been published in German language and claims priority from German patent application No. 10 2012 107 992.7, filed on Aug. 29, 2012. The entire contents of these priority applications are incorporated herein by reference.

BACKGROUND OF THE INVENTION

The invention generally relates to aseptic double seat valves. More specifically the invention relates to aseptic double seat valves of the type comprising a housing, which has connections for two pipe conduits, a first valve seat and a second valve seat, wherein the valve seats are arranged spaced apart from one another in the direction of a longitudinal axis in the housing, between the connections for the two pipe conduits, a first closing body, which interacts in a sealing manner with the first valve seat, and a second closing body, which interacts in a sealing manner with the second valve seat, a first elongate valve stem, which is of hollow design and is connected to the first closing body, and a second elongate valve stem, which extends through the interior of the first valve stem and is connected to the second closing body, and a diaphragm, which has a radially inner opening and serves to seal off a gap present between the first valve stem and the second valve stem.

An aseptic double seat valve of the type stated above is used, in particular, in a process engineering plant in which aseptic working conditions are required. This applies especially to process engineering plants in the food industry, in the beverage industry and in the pharmaceutical industry.

As compared with a double seat valve which does not have to comply with aseptic conditions, there is a requirement in the case of an aseptic double seat valve that medium which flows through the housing of the double seat valve cannot penetrate into the gap between the inner, second valve stem and the hollow outer, first valve stem. For this purpose, the aseptic double seat valve as known from DE 10 2006 025 653 C5 has a diaphragm having a radially inner opening for sealing the gap present between the first valve stem and the second valve stem. In the case of the known aseptic double seat valve, the outer rim of the seal is fixed in a sealing manner on the closing body which is at the top in the installed position of the double seat valve, while the inner rim of the seal is fixed in a sealing manner on the inner valve stem, more specifically at a distance from the closing body which is at the bottom in the installed position of the double seat valve, which body is connected to the inner valve rod.

This construction of the known aseptic double seat valve leads to the following disadvantages. One disadvantage is that the known double seat valve is not easy to maintain and service because it does not allow a construction in which the diaphragm is part of a preassembled module. The diaphragm can be removed from the double seat valve only as a single part. If the diaphragm has to be exchanged, the double seat valve must be disassembled into many individual parts in the region of the closing bodies in order to be able to remove the diaphragm. Conversely, when installing a new diaphragm in the known double seat valve, it is not possible to preinstall the diaphragm on a module consisting of elements outside the valve housing and then to insert this module as a whole into the housing with the diaphragm already fixed on the module. It is therefore also not possible to replace functional subassemblies of the double seat valve with functionally identical but structurally different subassemblies. For example, it may be desirable to operate the double seat valve with some sealing system other than a diaphragm as a seal for sealing off the gap between the first and the second valve stem, e.g. a corrugated bellows. For this purpose, the known double seat valve would have to be completely rebuilt.

Another disadvantage of the known aseptic double seat valve is that of leakage monitoring. Particularly in the case of aseptic double seat valves, it is necessary during the operation of the double seat valve to continuously monitor whether the sealing element or elements present on the first closing body and on the second closing body are interacting in a sealing manner with the respective valve seat or whether there is leakage and hence transfer of medium past the corresponding sealing element into the leakage space. For this purpose, the aseptic double seat valve is connected to a leakage monitoring device.

In the known double seat valve, a leakage monitoring means is not provided at the closing body at the bottom in the installed position for the sealing element present thereon. As a result, the leakage space between the two closing bodies cannot be cleaned chemically but only by means of steam sterilisation. In the case of chemical cleaning, chemical cleaning agent could cross from the leakage space into the other pipe conduit if the sealing element of the lower closing body were not leaktight, and it would not be possible to detect this in the known double seat valve in the absence of leakage monitoring for the lower closing body. If the intention were to provide leakage monitoring at the lower closing body, the inner valve rod would have to be of hollow design or to be bored out in order to allow leakage monitoring through the inner valve rod. However, this would result in weakening of the inner valve rod.

Document WO 98/54493 A1 has furthermore disclosed an aseptic double seat valve which has a diaphragm that is fixed in a sealing manner on both closing bodies and which simultaneously has the sealing function for sealing off the closing bodies with respect to the valve seats.

SUMMARY OF THE INVENTION

It is an object of the invention to develop an aseptic double seat valve in such a way that the ease of maintenance/servicing of the double seat valve is improved.

According to an aspect, an aseptic double seat valve is provided, comprising a housing, which has connections for two pipe conduits and a longitudinal axis, a first valve seat and a second valve seat, the first and second valve seats arranged in the housing and spaced apart from one another in direction of longitudinal axis between the connections for the two pipe conduits, a first closing body interacting in a sealing manner with the first valve seat, a second closing body interacting in a sealing manner with the second valve seat, a first elongate valve stem connected to the first closing body ad having a hollow interior, a second elongate valve stem extending through the interior of the first valve stem and connected to the second closing body, a radial gap between the first and second valve stems, a diaphragm having an outer rim and a radially inner opening having an inner rim, the diaphragm serving to seal off the gap between the first valve stem and the second valve stem, the outer rim of the diaphragm being fixed in a sealing manner on the second closing body, the inner rim of the opening of the diaphragm being fixed in a sealing manner on the first valve stem at a distance from the first closing body.

In the aseptic double seat valve according to the invention, the inner rim of the diaphragm is thus fixed in a sealing manner on the outer valve stem, which is of hollow design, while, in the known double seat valve, the inner rim of the diaphragm is fixed on the inner valve stem. In the aseptic double seat valve according to the invention, the outer rim of the diaphragm is furthermore fixed in a sealing manner on the second closing body, which is connected to the inner valve stem. Here, the inner rim of the diaphragm is fixed on the first valve stem at an axial distance from the first closing body.

The arrangement of the diaphragm in the manner according to the invention between the closing body which is preferably at the bottom in the installed position and the outer, hollow valve stem now makes it possible, in the region of the leakage space present between the two closing bodies, to combine functional parts of the double seat valve into preassembled modules or cartridges which comprise the lower closing body, the diaphragm and part of the hollow outer valve stem. The diaphragm, in particular, can be installed as an integral component in these preassembled cartridges or modules, making the maintenance of the double seat valve considerably easier for the user of the double seat valve, because it is precisely the exchange and proper installation of the diaphragm which is difficult. In contrast, all that the user needs from the manufacturer is a preassembled cartridge, which can also be installed and removed easily by the user, while the diaphragm is already properly mounted in the cartridge.

Moreover, the user of the double seat valve can thus use different systems in the region of the leakage space for sealing off the gap between the valve stems, it being possible, for example, for a cartridge containing a diaphragm to be replaced by a cartridge which, instead of the diaphragm, has a corrugated bellows for sealing off the gap between the valve stems, for example. Other simple sealing systems can also be considered here.

In contrast, a modular construction of this kind is not possible with the known double seat valve. The reason is that the inner rim of the diaphragm is fixed on the inner valve stem. On the one hand, this arrangement entails that the inner rim of the diaphragm must be in engagement with the inner valve stem, for which purpose it is necessary that the inner valve stem should be free in the region of engagement, i.e. must not be enclosed by the outer valve stem there. Moreover, the inner valve stem is typically and preferably of integral design, and therefore the known diaphragm arrangement is from the outset unsuitable for modular construction in the form of interchangeable cartridges in the region of the leakage space.

Furthermore, the arrangement of the diaphragm in the manner according to the invention between the closing body which is preferably at the bottom in the installed position and the outer valve stem of hollow design makes it possible to provide leakage monitoring at the lower closing body without the need for the inner valve stem to be hollow to achieve this. This will be described in greater detail below.

With a view to an axially short construction, the inner rim of the diaphragm is preferably fixed on the first valve stem at a distance from the first closing body such that the diaphragm extends only a short distance or essentially not at all in the direction of the longitudinal axis. Here, the inner rim of the diaphragm is situated axially approximately at the level of the fastening points of the outer rim of the diaphragm on the second closing body or is at most at a short distance axially from this fastening point.

In a preferred embodiment, the first valve stem has a hollow extension which extends from the first closing body towards the second closing body and is releasably connected to the first closing body, and through which an end of the second valve stem which faces the second closing body extends, and wherein the inner rim of the diaphragm is fixed in a sealing manner on the extension.

On the one hand, this measure makes it possible to configure the diaphragm with a short length in the axial direction because the inner rim of the diaphragm can be fixed on the extension of the first valve stem in direct axial proximity to the second closing body. On the other hand, the releasable connection of the extension to the first closing body has the advantage that, with a view to a modular construction, the functional elements including the diaphragm can be combined, starting from the first closing body, into a cartridge which can be removed as a whole in a simple manner from the first closing body.

It is furthermore preferred here if the extension has two sleeve-shaped sections, which are connected releasably to one another and between which the inner rim of the diaphragm is clamped.

This measure further improves the ease of assembly and hence also the ease of maintenance of the double seat valve since the inner rim of the seal is inserted between the two releasably interconnected sleeve-shaped sections and is then clamped in place by connecting, preferably screwing, the two sleeve-shaped sections together. With a view to a preassemblable construction in the form of cartridges, this process can take place completely outside the housing.

It is furthermore preferred here if, on a side of the first closing body which faces the second closing body, the extension has a disc, the outer rim of which rests in a sealing manner against that side of the first closing body which faces the second closing body, in interaction with a sealing element of the first closing body.

It is advantageous here that the disc of the extension of the first valve stem together with the first closing body allows leakage monitoring in the region of the first closing body. If the sealing element of the first closing body loses its sealing effect and leakage therefore occurs, the leakage can penetrate between the disc and the first closing body and can be detected by the leakage monitoring device.

In this context, it is preferred if there is a gap for leakage monitoring between the disc and the first closing body, which gap communicates with the gap between the first and the second valve stem.

It is thus advantageously possible, by virtue of the communication of the gap between the disc and the first closing body with the gap between the first and the second valve stem, to monitor the leaktightness of the sealing element of the first closing body by means of the same leakage monitoring device which monitors penetration of leakage into the gap between the first and the second valve stem in the region of the diaphragm.

In another preferred embodiment, the second closing body is in the form of a cup, the open side of which faces away from the first closing body and the base of which faces the first closing body and is provided with a radially inner opening, into which the first valve stem projects, wherein an outer rim of the cup interacts in a sealing manner with the second valve seat, and wherein the outer rim of the diaphragm is clamped between a rim of the opening of the base of the cup and a counter holder connected releasably to the cup.

This embodiment has the advantage that the fixing of the outer rim of the diaphragm between the counter holder and the rim of the opening of the base of the cup can be carried out in an easily manageable way, especially if the counter holder can be screwed to the cup. The counter holder is preferably screwed to the cup in the interior of the latter.

In contrast to the known aseptic double seat valve, the cup-shaped embodiment of the second closing body furthermore also allows leakage monitoring in the region of the second closing body. Leakage monitoring in the region of the second closing body is made possible in a simple manner by the cup-shaped embodiment of the second closing body because the interior of the cup can be used as a cavity for leakage monitoring without the need for the second valve stem to be of hollow design or to be bored out for this purpose. The most that is required on the second valve stem are milled cuts on the outer circumference to allow communication of the interior of the cup with the leakage monitoring device which also monitors the gap between the two valve stems.

It is furthermore preferred here if the open side of the cup is closed in a sealed manner by a removable cap, the outer rim of which rests in a sealing manner against the outer rim of the cup in interaction with a sealing element of the second closing body.

This embodiment, which is similar to the abovementioned embodiment, according to which the first valve stem has a disc which rests in a sealing manner against the side of the first closing body which faces the second closing body, advantageously allows reliable leakage monitoring at the second closing body. If there is a malfunction in the sealing element of the second closing body, leakage penetrates between the cap and the second closing body into the cup-shaped cavity and can then be detected.

An interior of the cup furthermore communicates with the gap between the first valve stem and the second valve stem.

Once again, it is advantageous here that the same leakage monitoring device which monitors the penetration of leakage into the gap between the first and the second valve stem can also be used to detect a leak in the sealing element of the second closing body.

In another preferred embodiment of one or more of the abovementioned embodiments, the arrangement comprising the extension, the second closing body, the counter holder and the diaphragm fixed between the second closing body and the extension forms a cartridge which can be preassembled and can be exchanged as a whole.

In other words, the abovementioned cartridge is advantageously in the form of a preassemblable subassembly which can be exchanged or installed without effort, even by the customer, with an already integrated diaphragm without the need for factory-based customer service to achieve this.

Moreover, this embodiment makes it possible, as envisaged in another preferred embodiment, to install a replacement cartridge instead of the cartridge comprising the diaphragm into the double seat valve, said replacement cartridge having a seal designed as a corrugated bellows or as some other sealing system for the purpose of sealing off the gap between the two valve stems.

Thus, the double seat valve according to the invention in this embodiment makes it possible to use different seal systems for sealing off the gap between the valve stems without the need to completely rebuild the double seat valve for this purpose. Replacing the cartridge comprising the diaphragm with a replacement cartridge comprising a different sealing system can also be carried out at the customer's premises by the users of the double seat valve themselves without the need for factory-based customer service for this purpose.

The extension of the first valve stem is preferably screwed to the first closing body, and the cup is likewise preferably screwed to the counter holder.

The arrangement comprising the extension, the cup and the counter holder is held together by the diaphragm, the outer rim of which, on the one hand, is clamped between the cup and the counter holder and the inner rim of which is fixed on the extension.

As a further preferred option, the first valve seat and/or the second valve seat are axial-radial valve seats.

Axial-radial sealing seats have the advantage of higher operational reliability as compared with radial sealing seats, especially during the so called "short stroke operation" of the two closing bodies.

Further advantages and features will become apparent from the following description and the attached drawing.

It is self-evident that the features mentioned above and those which remain to be explained can be used not only in the respectively indicated combination but also in other combinations or in isolation without departing from the scope of the present invention.

BRIEF DESCRIPTION OF THE DRAWINGS

An illustrative embodiment of the invention is shown in the drawings and is described in greater detail below with reference to said drawings, in which.

DESCRIPTION OF PREFERRED EXEMPLARY EMBODIMENTS

Figure 1:
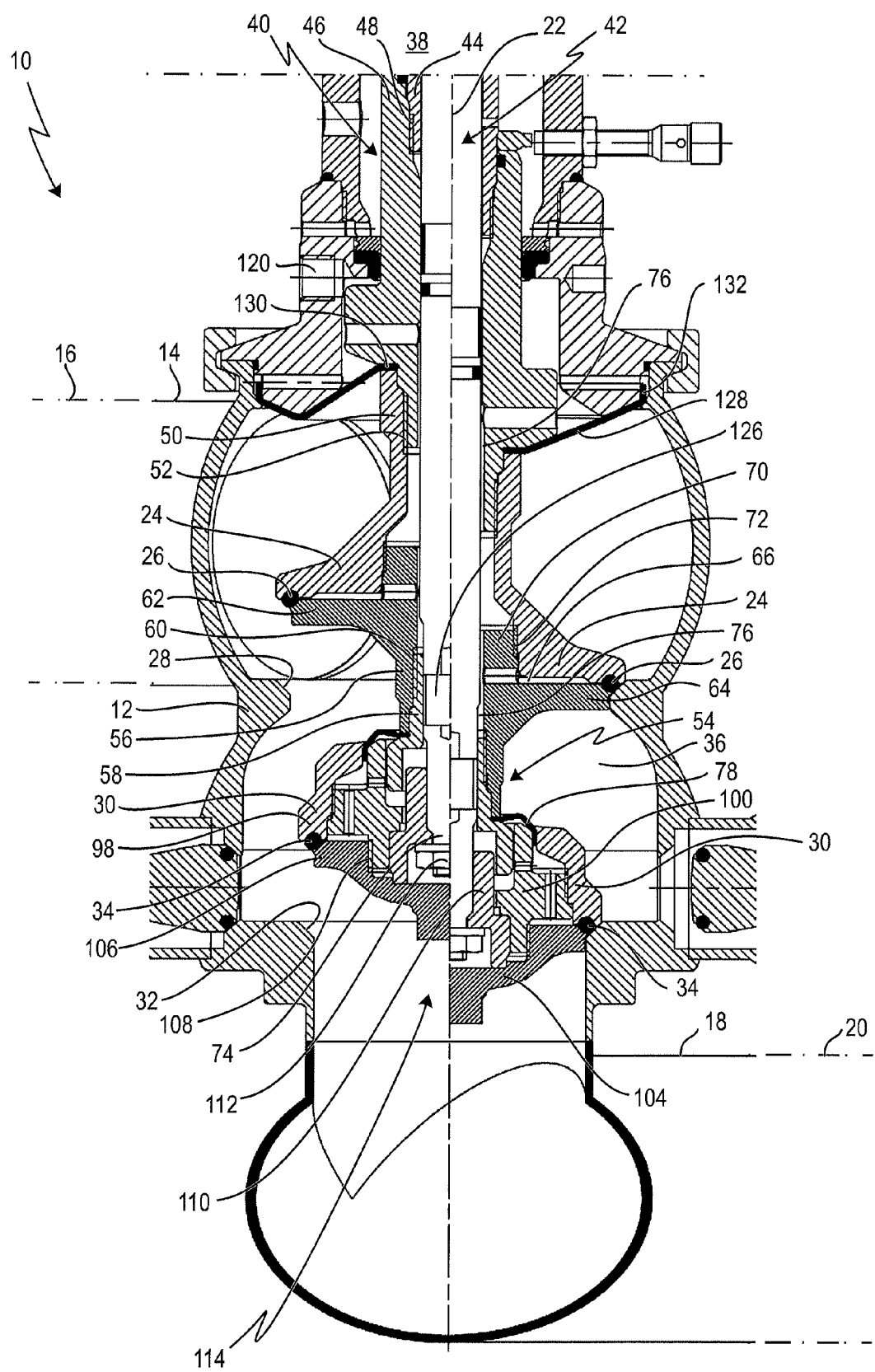
FIG. 1 shows a portion of an aseptic double seat valve in longitudinal section.
Figure 2:
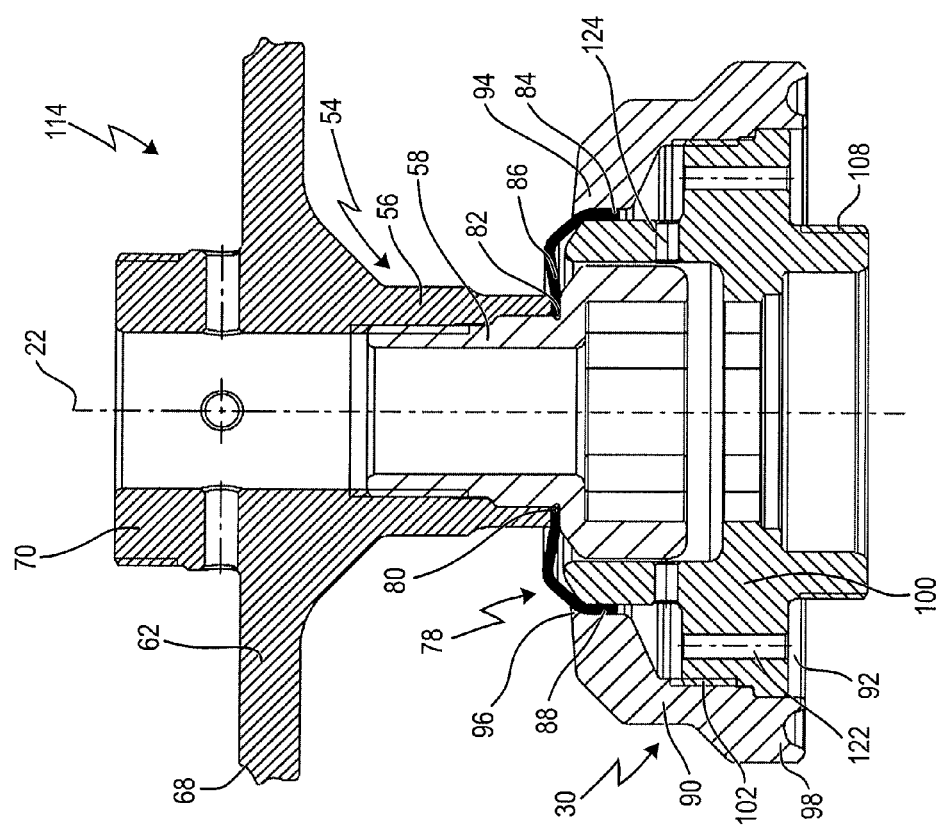
FIG. 2 shows a subassembly of functional elements of the double seat valve in FIG. 1 preassembled as a cartridge, in isolation, in longitudinal section and on a larger scale than in FIG. 1.

A portion of an aseptic double seat valve provided with the general reference sign 10 is shown in FIG. 1. FIG. 2 shows further details of the double seat valve 10.

According to FIG. 1, the double seat valve 10 has a housing 12 which has a connection 14 for a pipe conduit 16, indicated by broken lines, and a connection 18 for a pipe conduit 20, indicated by broken lines. The double seat valve 10 is used for connecting and separating the pipe conduits 16 and 20 to and from one another in a switchable manner.

In FIG. 1, a longitudinal axis of the double seat valve 10 is provided with the reference sign 22.

Arranged in the housing 12 is a first closing body 24. The first closing body 24 has a sealing element 26. The first closing body 24 interacts in a sealing manner with a first valve seat 28, which is arranged in the housing 12 between the first connection 14 and the second connection 13. The right-hand half of the drawing in FIG. 1 shows the first closing body 24 in sealing contact with the first valve seat 28, while the left-hand half of the drawing in FIG. 1 shows the closing body 24 in the open position thereof, in which the first closing body 24 has moved upwards away from the first valve seat 28.

A second closing body 30, which is spaced apart from the first closing body 24 in the direction of the longitudinal axis 22, is arranged in the housing 12.

The second closing body 30 interacts in a sealing manner with a second valve seat 32, which is arranged in the housing 12 between the first connection 14 and the second connection 13. For sealing contact with the second valve seat 32, the second closing body 30 has a sealing element 34.

The right-hand half of the drawing in FIG. 1 shows the second closing body 30 in its closed position, in which the second closing body 30 rests in a sealing manner against the second valve seat 32. The left-hand half of the drawing in FIG. 1 shows the second closing body 30 in its open position, in which the second closing body 30 has moved upwards away from the second valve seat 32.

The valve seats 28 and 32 are axial-radial valve seats.

In the operating state of the double seat valve 10 shown in the left-hand half of the drawing in FIG. 1, the pipe conduits 16 and 20 are connected to one another for the transfer of medium, i.e. a medium, e.g. a product, can cross from pipe conduit 16 to pipe conduit 20 or vice versa. In the operating state of the double seat valve 10 shown in the right-hand half of the drawing in FIG. 1, the pipe conduits 16 and 20 are separated from one another or shut off from one another. In this operating state, it is thus impossible for any medium to cross from pipe conduit 16 to pipe conduit 20 or vice versa.

The closing bodies 24 and 30 can also assume other operating states (not shown), which are referred to as "short stroke operation". In the case of short stroke operation of the first closing body 24, said body is raised upwards slightly away from the first valve seat 28, while the second closing body 30 remains in its closed position as shown in the right-hand half of the drawing in FIG. 1. During short stroke operation of the second closing body 30, said body is raised upwards slightly from the second valve seat 32, while the first closing body 24 remains in its closed state as shown in the right-hand half of the drawing in FIG. 1.

Short stroke operation of the first closing body 24 or the second closing body 30 is used to clean a leakage space 36 situated between the two valve seats 28 and 32 in the housing 12 with a cleaning agent. The cleaning agent can be fed in via pipe conduit 16, while the first closing body 24 is then lifted by a short stroke, while the second closing body 30 remains in its closed position, or the cleaning agent can be fed in via pipe conduit 20, in which case the second closing body 30 is then lifted by a short stroke, while the first closing body 24 remains in its closed position.

The abovementioned different movements of the first closing body 24 and of the second closing body 30 are controlled by a drive 38 (not shown specifically), which is designed as a pneumatic drive, as is customary for double seat valves.

The drive 38 acts on the first closing body 24 via an elongate first valve stem 40, which is connected to the first closing body 24 and is of hollow design. The drive 38 acts on the second closing body 30 via an elongate second valve stem 42, which extends through the first valve stem 40. In this arrangement, the second valve stem 42 can move relative to the first valve stem 40 in the direction of the longitudinal axis 22, and the first valve stem 40 can likewise move relative to the second valve stem 42 in the direction of the longitudinal axis 22 in order to allow the mutually independent short stroke lifting of the closing bodies 24 and 30.

Starting from the drive 38, the first valve stem 40 is of multi-part design and, in the segment shown, has stem parts 44 and 46 which are screwed together by means of a thread 48, while stem part 46 is screwed by means of a thread 52 to a tubular piece 50 connected integrally to the first closing body 24.

However, as viewed from the drive 38, the first valve stem 40 does not end at the first closing body 24 but continues from the first closing body 24 to the second closing body 30 in an extension 54. The extension 54 of the first valve stem 40 has two sleeve-shaped sections 56 and 58, which are screwed together by means of a thread 60. Sleeve-shaped section 56 widens towards the first closing body 24 in the form of a disc 62, the outer rim 64 of which rests in a sealing manner against that side of the first closing body 24 which faces the second closing body 30, while there remains between the disc 62 and the first closing body 24 a gap 66 which, as described below, serves for leakage monitoring. Sealing of the disc 62 against the first closing body 24 is accomplished by means of the sealing element 26 of the first sealing body 24.

As can be seen from FIG. 2, the disc 62 has on its outer circumference a contoured profile 68 matched to the sealing element 26.

The sleeve-shaped section 56 furthermore has a section 70, which engages in the first closing body 24, the latter being of hollow design in the radially central region, and which is screwed to the first closing body 24 by means of a thread 72. By release of the screwed joint between the sleeve-shaped section 56 and the first closing body 24, the extension 54 can thus be removed from the first closing body 24.

In the portion shown in FIG. 1, or at least in the region thereof which extends through the housing 12, the second valve stem 42 is in one piece and is designed as a rod consisting of a solid material. The second valve stem 42 has a lower end 74 which is situated approximately at the level of the second closing body 30.

Between the first valve stem 40 and the second valve stem 42 there is a gap 76 since the two valve stems 40 and 42 must be capable of longitudinal movement relative to one another. The gap 76 also extends along the extension 54. However, there is a need with an aseptic double seat valve to prevent product or cleaning agent from penetrating into the gap 76. The gap 76 must therefore be sealed off from the interior of the housing 12. For this purpose, the double seat valve 10 has a diaphragm 78, the diaphragm and the installation thereof being additionally described in greater detail below with reference to FIG. 2.

The diaphragm 78 has an opening 80 which is radially on the inside in relation to the longitudinal axis 22. Due to the opening 80, the diaphragm 78 has an inner rim 82. The diaphragm 78 furthermore has an outer rim 84. Overall, the diaphragm 78 has the shape of an annular collar, having a section 86 extending substantially perpendicularly to the longitudinal axis 22 and a section 88 extending substantially parallel to the longitudinal axis 22.

The outer rim 84 or section 88 of the diaphragm 78 is fixed in a sealing manner on the second closing body 30, while the inner rim 82 or section 86 is fixed in a sealing manner on the first valve stem 40.

In this arrangement, the inner rim 82 of the diaphragm 78 is clamped axially between the sleeve-shaped sections 56 and 58 of the first valve stem 40.

In this arrangement, the location at which the inner rim 82 of the diaphragm 78 is fixed is a long way from the first closing body 24, as is apparent from FIG. 1.

The second closing body 30 is in the form of a cup 90, the open side 92 of which faces away from the first closing body 24 according to FIG. 1, while a base 94 of the cup 90 faces the first closing body 24. The base 94 is provided with an opening 96 which is radially on the inside in relation to the longitudinal axis 22 and into which, as shown in FIG. 1, the first valve stem 40, in this case the sleeve-shaped section 58 of the first valve stem 40, projects.

An outer rim 98 of the cup 90 interacts in a sealing manner with the second valve seat 32 by means of the sealing element 34.

A counter holder 100 is arranged in the interior of the cup 90 and is screwed to the cup 90 on the inside by means of a thread 102.

In this arrangement, the outer rim 84 of the diaphragm 78 is clamped radially between the rim of the opening 96 of the cup 90 and the counter holder 100.

As can be seen from FIGS. 1 and 2, the diaphragm 78 is of short construction in the axial direction, i.e. in the direction of the longitudinal axis 22.

According to FIG. 1, the open side 92 of the cup 90 is closed in a sealed manner by a removable cap 104. In this arrangement, an outer rim 106 of the cap 104 rests in a sealing manner against the outer rim 98 of the cup 90 in interaction with the sealing element 34. For this purpose, there is on the outer rim 106 of the cap 104 a contoured profile that is comparable to the contoured profile 68 on the disc 62 and that is matched to the sealing element 34.

The cap 104 is screwed to the counter holder 100 by means of a thread 108. The counter holder 100 can move in the direction of the longitudinal axis 22 relative to the first valve stem 40, more precisely to the sleeve-shaped section 58 of the first valve stem 40, in order to allow short stroke lifting of the second closing body 30 independently of the first closing body 24.

The second closing body 30 is connected securely not only to the counter holder 100 but also to the second valve stem 42 in as much as a plug-in sleeve 110 is, on the one hand, held positively against the second valve stem 42 by means of a nut 112 and is, on the other hand, held positively against the counter holder 100.

The arrangement consisting of the extension 54 of the first valve stem 40, the second closing body 30, the counter holder 100 and the diaphragm 78 fixed between the second closing body 30 and the extension 54 forms a preassemblable cartridge 114 that can be exchanged as a whole, which is shown in isolation in FIG. 2.

The cartridge 114 thus already contains the diaphragm 78 in its installed position, corresponding also to its installed position in the double seat valve 10 shown in FIG. 1. Due to its being clamped between the sleeve-shaped sections 56 and 58 of the first valve stem 40, on the one hand, and its being clamped between the cup 90 and the counter holder 100, on the other hand, the diaphragm 78 holds the cartridge 114 together.

To remove the cartridge 114 from the double seat valve 10 in FIG. 1, the cap 104 is unscrewed from the counter holder 100. The nut 112 is unscrewed from the second valve stem 42, after which the plug-in sleeve 110 can be pulled out. All that is then required is to release the connection between the first closing body 24 and the cartridge 114, for which purpose all that is required is to unscrew the sleeve-shaped extension 56 including the disc 62 from the first closing body 24.

Maintenance of the double seat valve 10 is thus significantly simplified. In the case of wear on the diaphragm 78, the user of the double seat valve 10 can remove the cartridge 114 in a simple manner as a whole and then install a new cartridge in the double seat valve 10 in an equally simple manner, as described above.

Figure 3:
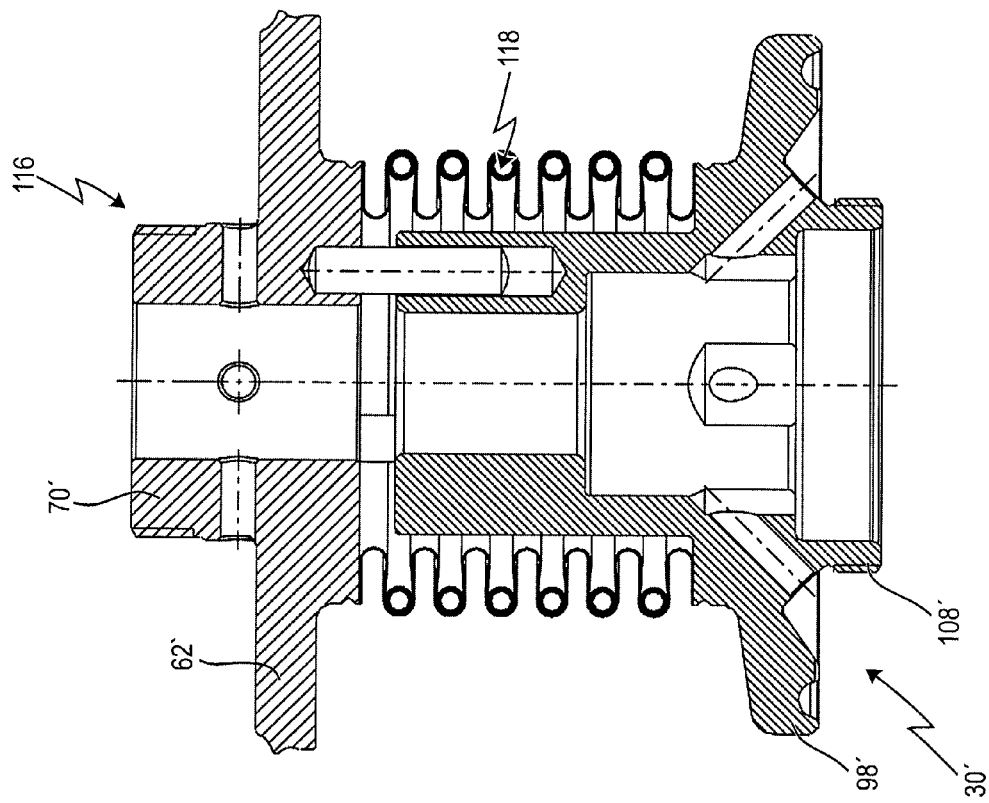
FIG. 3 shows a replacement cartridge in a view similar to that in FIG. 2, which can be installed in the double seat valve in FIG. 1 in place of the cartridge in FIG. 2.

By virtue of the combination of the functional elements of the sealing system for sealing off the gap 76 between the first valve stem 40 and the second valve stem 42 in the form of the cartridge 114, it is however likewise possible to install a replacement cartridge 116, illustrated in FIG. 3, in the double seat valve 10 in FIG. 1 instead of cartridge 114. Instead of the diaphragm 78, the replacement cartridge 116 has a corrugated bellows 118, for example. In the region of the releasable connection to the first closing body 24, the replacement cartridge 116 is of identical design to cartridge 114, i.e. the replacement cartridge 116 has an extension 70' of the first valve stem 40 for screwing to the first closing body 24 and a disc 62' of identical construction to the extension 70 and the disc 62 of cartridge 114. In its outer rim region 98', in which it interacts with the second valve seat 32, a second closing body 30' of the replacement cartridge 116 is of identical design to the outer rim region 98 of the first closing body 30, while the counter holder 100 is omitted from the replacement cartridge 116. In order to be able to attach the cap 104, a thread 108', which corresponds to the thread 108 of the counter holder 100 of cartridge 114, is formed on the second closing body 30', thus allowing the cap 104 to be screwed directly to the second closing body 30.

The double seat valve 10 is improved not only as regards the ease of maintenance and servicing thereof as compared with the known double seat valve but also as regards leakage monitoring.

A description has already been given above of the fact that a malfunction of the sealing element 26 of the first closing body 24 due to penetration of leakage into the gap 66 between the first closing body 24 and the disc 62 can be detected by virtue of the fact that gap 66 communicates with the gap 76 between the first valve stem 40 and the second valve stem 42, which in turn communicates with a connection 120 to which a leakage monitoring device (not shown) is connected. However, it is not only in the region of the first closing body 24 but also in the region of the second closing body 30 that leakage monitoring is possible without the need for the second valve stem 42 to be hollow or bored out for this purpose.

It is namely possible for a malfunction of the sealing element 34 to be detected from the fact that, in such a case, leakage penetrates into the cavity or interior of the cup 90, which communicates with gap 76. Leakage can penetrate via channels 122, 124 in the counter holder 100 (see FIG. 2) as far as the gap 76 between the first valve stem 40 and the second valve stem 42, thus allowing such a leakage likewise to be detected by means of the leakage monitoring device connected to the connection 120. All the leakage which occurs in the double seat valve 10 can thus be detected via the gap 76 between the first valve stem 40 and the second valve stem 42 using the same leakage monitoring device connected to the connection 120, without the need for the second valve stem 42 to be bored out or hollow to achieve this. Flats 126 can simply be provided locally on the second valve stem 42 in order to ensure the passage of leakage through gap 76. However, such flats 126 do not weaken the second valve stem 42.

The double seat valve 10 furthermore has a second diaphragm 128, which serves to seal off the interior of the housing 12 from the drive 38. In this arrangement, an inner rim 130 of the diaphragm 128 is fixed in a sealing manner on the first valve stem 40, and an outer rim 132 of the diaphragm 128 is fixed in a sealing manner on the housing 12.

What is claimed is:

1. An aseptic double seat valve, comprising:
   a housing, which has connections for two pipe conduits,
   a first valve seat and a second valve seat, the first and second valve seats arranged spaced apart from one another in direction of a longitudinal axis in the housing and between the connections for the two pipe conduits,
   a first closing body which interacts in a sealing manner with the first valve seat,
   a second closing body which interacts in a sealing manner with the second valve seat,
   a first elongate valve stem connected to the first closing body and having a hollow interior, a second elongate valve stem extending through the interior of the first valve stem and connected to the second closing body, a diaphragm having a radially inner opening and serves to seal off a gap between the first valve stem and the second valve stem, an outer rim of the diaphragm being fixed in a sealing manner on the second closing body, an inner rim of the diaphragm being fixed in a sealing manner on the first valve stem at a distance from the first closing body.

2. An aseptic double seat valve, comprising:

a housing, which has connections for two pipe conduits, a first valve seat and a second valve seat, the first and second valve seats arranged spaced apart from one another in direction of a longitudinal axis in the housing and between the connections for the two pipe conduits, a first closing body which interacts in a sealing manner with the first valve seat, a second closing body which interacts in a sealing manner with the second valve seat, a first elongate valve stem connected to the first closing body and having a hollow interior, a second elongate valve stem extending through the interior of the first valve stem and connected to the second closing body, a diaphragm having a radially inner opening and serves to seal off a gap between the first valve stem and the second valve stem, an outer rim of the diaphragm being fixed in a sealing manner on the second closing body, and an inner rim of the diaphragm being fixed in a sealing manner on the first valve stem at a distance from the first closing body, wherein the first valve stem has a hollow extension extending from the first closing body towards the second closing body and is releasably connected to the first closing body, an end of the second valve stem which faces the second closing body extending through the extension, the inner rim of the diaphragm being fixed in a sealing manner on the extension.

3. The double seat valve of claim 2, wherein the extension has two sleeve-shaped sections, which are connected releasably to one another, the inner rim of the diaphragm being clamped between the two sleeve-shaped sections.

4. The double seat valve of claim 2, wherein, on a side of the first closing body which faces the second closing body, the extension has a disc, an outer rim of the disc resting in a sealing manner against a side of the first closing body which faces the second closing body, in interaction with a sealing element of the first closing body.

5. The double seat valve of claim 4, wherein there is a gap for leakage monitoring between the disc and the first closing body, which gap for leakage monitoring communicates with the gap between the first and the second valve stem.

6. An aseptic double seat valve, comprising:

a housing, which has connections for two pipe conduits, a first valve seat and a second valve seat, the first and second valve seats arranged spaced apart from one another in direction of a longitudinal axis in the housing and between the connections for the two pipe conduits, a first closing body which interacts in a sealing manner with the first valve seat, a second closing body which interacts in a sealing manner with the second valve seat, a first elongate valve stem connected to the first closing body and having a hollow interior, a second elongate valve stem extending through the interior of the first valve stem and connected to the second closing body, a diaphragm having a radially inner opening and serves to seal off a gap between the first valve stem and the second valve stem, an outer rim of the diaphragm being fixed in a sealing manner on the second closing body, and an inner rim of the diaphragm being fixed in a sealing manner on the first valve stem at a distance from the first closing body, wherein the second closing body is in the form of a cup, an open side of the cup facing away from the first closing body, and a base of the cup facing the first closing body and having a radially inner opening, the first valve stem projecting into the radially inner opening of the base, an outer rim of the cup interacting in a sealing manner with the second valve seat, the outer rim of the diaphragm being clamped between a rim of the radially inner opening of the base of the cup and a counter holder connected releasably to the cup.

7. The double seat valve of claim 6, further comprising a removable cap closing the open side of the cup in a sealed manner, an outer rim of the cap resting in a sealing manner against the outer rim of the cup in interaction with a sealing element of the second closing body.

8. The double seat valve of claim 6, wherein an interior of the cup communicates with the gap between the first and the second valve stem.

9. The double seat valve of claim 2, wherein the extension, the second closing body, a counter holder and the diaphragm fixed between the second closing body and the extension form a cartridge which can be preassembled and can be exchangeable as a whole.

10. The double seat valve of claim 9, wherein the extension is screwed to the first closing body.

11. The double seat valve of claim 9, wherein the exchangeable cartridge is replaceable with a replacement cartridge having a seal designed as a corrugated bellows for the purpose of sealing off the gap between the first valve stem and the second valve stem.

12. The double seat valve of claim 1, wherein at least one of the first valve seat and the second valve seat are axial-radial valve seats.

* * * * *